(12) United States Patent
Tabuchi et al.

(10) Patent No.: US 11,602,986 B2
(45) Date of Patent: Mar. 14, 2023

(54) TANK MADE OF RESIN

(71) Applicant: HONDA MOTOR CO., LTD., Tokyo (JP)

(72) Inventors: Daisuke Tabuchi, Wako (JP); Ko Kurata, Wako (JP); Atsushi Murakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 306 days.

(21) Appl. No.: 16/764,137

(22) PCT Filed: Nov. 16, 2018

(86) PCT No.: PCT/JP2018/042466
§ 371 (c)(1),
(2) Date: May 14, 2020

(87) PCT Pub. No.: WO2019/107185
PCT Pub. Date: Jun. 6, 2019

(65) Prior Publication Data
US 2020/0276900 A1 Sep. 3, 2020

(30) Foreign Application Priority Data
Nov. 30, 2017 (JP) .............................. JP2017-231016

(51) Int. Cl.
*B60K 15/04* (2006.01)
*B62J 35/00* (2006.01)
*B60K 15/03* (2006.01)

(52) U.S. Cl.
CPC ............... *B60K 15/04* (2013.01); *B62J 35/00* (2013.01); *B60K 2015/03059* (2013.01); *B60K 2015/03486* (2013.01)

(58) Field of Classification Search
CPC .... B60K 2015/0458; B60K 2015/0496; B60K 15/04; B60K 2015/03059;
(Continued)

(56) References Cited

U.S. PATENT DOCUMENTS

2002/0063129 A1 5/2002 Potter et al.
2015/0239340 A1* 8/2015 Kito ....................... B60K 15/04
220/86.1

FOREIGN PATENT DOCUMENTS

| JP | 2003-146091 | 5/2003 |
| JP | 2009-101748 | 5/2009 |
| JP | 2016-016698 | 2/2016 |

OTHER PUBLICATIONS

International Search Report, dated Jan. 22, 2019 (dated Jan. 22, 2019), 4 pages.
(Continued)

*Primary Examiner* — Stephen J Castellano
(74) *Attorney, Agent, or Firm* — Rankin, Hill & Clark LLP (57) ABSTRACT

A tank made of resin provided with a barrier layer, which prevents the barrier layer from rolling up and has improved durability. In a tank made of resin that includes a barrier layer provided on an inner surface of a tank body made of resin, an opening part is provided in the barrier layer, a thick part projecting toward an inside or an outside of the tank body is provided in a resin layer at an outer peripheral part of the opening part, and the barrier layer and a casting flange part at a base of an oil filling port tubular part are molded with the resin of the tank body in a state in which the casting flange part is located at the thick part.

6 Claims, 9 Drawing Sheets

(58) Field of Classification Search
CPC . B60K 2015/03486; B60K 2015/03046; B62J 35/00
See application file for complete search history.

(56) References Cited

OTHER PUBLICATIONS

Written Opinion of the International Searching Authority dated Jan. 22, 2019 filed in PCT/JP2018/042466, 5 pages.
Indian Office Action (includes English text) dated Feb. 11, 2021, 7 pages.
International Preliminary Report on Patentability, International Application No. PCT/JP2018/042466 dated Jun. 11, 2020, 8 pages.

* cited by examiner

TANK MADE OF RESIN

This application is the national stage (Rule 371) of international application No. PCT/JP2018/042466 filed 16 Nov. 2018. This application claims foreign priority benefit to Japanese document No. JP2017-231016 filed 30 Nov. 2017.

TECHNICAL FIELD

The present invention relates to a tank made of resin, and particularly to a tank made of resin that has a barrier layer configured to reduce transmittance of fuel and the like.

BACKGROUND ART

Figure 5:
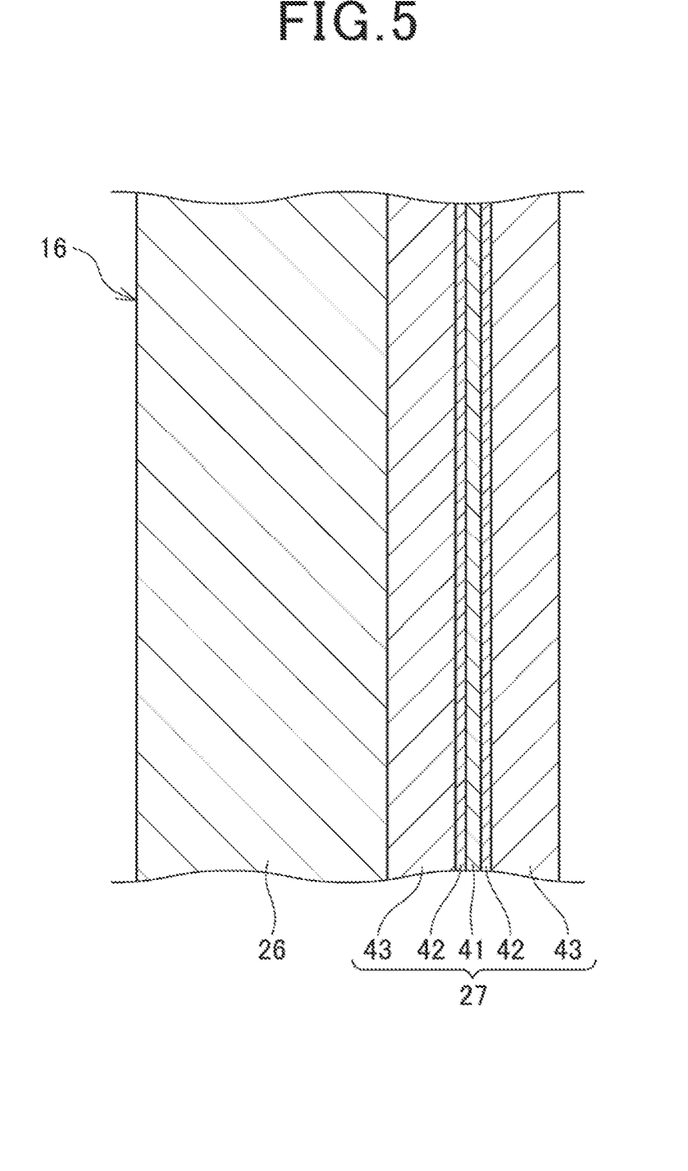
FIG. 5 is a sectional view illustrating a tank body and a barrier layer of an upper half body.
Figure 6:
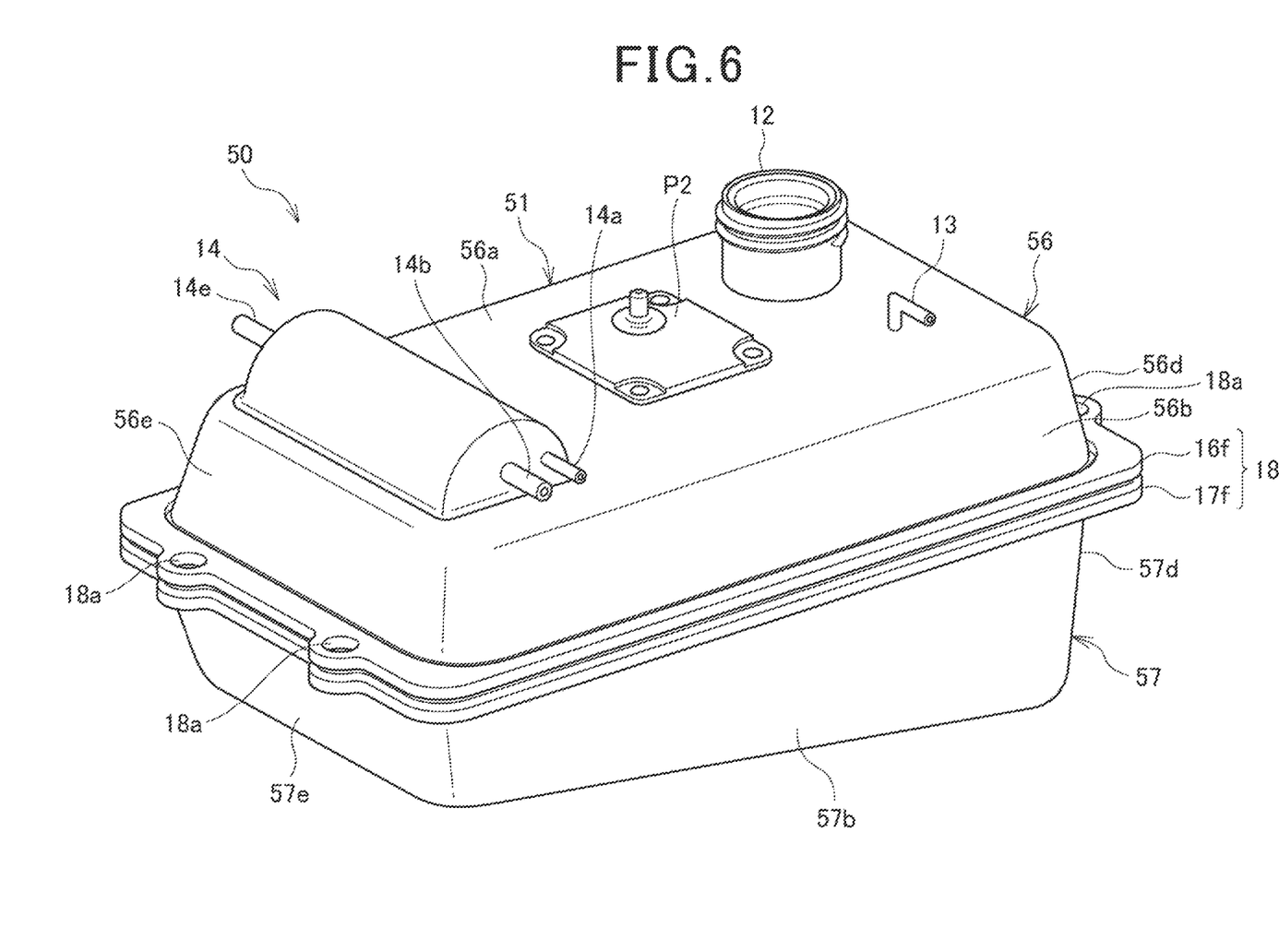
FIG. 6 is a perspective view illustrating a shape modification example of the fuel tank illustrated in FIG. 1.

In the related art, in a case in which a barrier layer is integrated with a base of a tank oil filling port member through blow molding, it is necessary to provide a tank oil filling port member with which a mouth fitting is integrated separately from a tank in advance, welding the barrier layer to the tank oil filling port member through blow molding in a state in which no hole is provided, then cutting a portion corresponding to an opening in the barrier layer that communicates with the mouth fitting open a hole in the barrier layer such that the oil filling port member communicates with the tank (see FIGS. 5 and 6 and the like in Patent Literature 1, for example).

CITATION LIST

Patent Literature

Patent Literature 1: Japanese Patent Laid-Open No. 2009-101748

SUMMARY OF INVENTION

Technical Problem

In a case in which the hole part is cut after the molding as in the blow molding, an end edge of the barrier layer is uncovered, the barrier layer is thus likely to roll up, and the rolling-up of the barrier layer is to be solved.

Further, since an oil filling nozzle is inserted into an oil filling port at the oil filling port tubular part of the tank made of resin, there is a concern that the oil filling nozzle is brought into contact with the barrier layer, and the barrier layer is to be protected from the oil filling nozzle.

The present invention was made in view of the aforementioned circumstances, and an object thereof is to provide a tank made of resin provided with a barrier layer, which prevents the barrier layer from rolling up and has improved durability.

Solution to Problem

The specification includes the entire content of Japanese Patent No. 2017-231016 filed on Nov. 30, 2017.

According to the present invention, there is provided a tank made of resin including: a barrier layer (27, 227) provided on an inner surface of a tank body (26, 226) made of resin, in which an opening part (27*d*, 227*d* ) is provided in the barrier layer (27, 227), a thick part (26*a*, 226*a*) projecting toward an inside or an outside of the tank body (26, 226) is provided in a resin layer at an outer peripheral part of the opening part (27*d*, 227*d*), and the barrier layer (27, 227) and a casting flange part (80*b*, 180*b*, 280*b*) at a base of an oil filling port tubular part (80, 180, 280) are molded with the resin of the tank body (26, 226) in a state in which the casting flange part (80*b*, 180*b*, 280*b*) is located at the thick part (26*a*, 226*a*).

In the aforementioned present invention, a guide wall (80*c*, 181*e*, 281*e*) along which an oil filling nozzle is guided may be provided at a lower portion of the oil filling port tubular part (80, 180, 280), and an end edge (27*a*, 227*a*) of the opening part (27*d*, 227*d*) in the barrier layer (27, 227) may be located outside the guide wall (80*c*, 181*e*, 281*e*) in a radial direction.

Also, in the aforementioned present invention, the end edge (27*a*) of the opening part (27*d*) in the barrier layer (27) may have a cylindrical shape or a conical shape with a section bent with a curvature, and a distal end (27*e*) may be located inside a recessed groove (80*d*) formed in the casting flange part (80*b*).

Also, in the aforementioned present invention, an annular step part (180*f*) may be provided between the lower portion of the oil filling port tubular part (180) and the casting flange part (180*b*), and the end edge (27*a*) of the opening part (27*d*) in the barrier layer (27) may be inserted into the step part (180*f*) to locate the distal end (27*e*).

Also, in the aforementioned present invention, a mouth fitting member (181) may be provided at the oil filling port tubular part (180), and the mouth fitting member (181) may include an attachment part (181*b*) that is a lid member for an oil filling port (112) and a guide wall (181*e*) located at the lower portion of the oil filling port tubular part (180).

Also, in the aforementioned present invention, a distal end (227*e*) of the end edge (227*a*) of the opening part (227*d*) in the barrier layer (227) may be located inside a recessed groove (280*g*) formed in an outer peripheral surface of the lower portion of the oil filling port tubular part (280).

Also, in the aforementioned present invention, a mouth fitting member (281) may be provided at the oil filling port tubular part (280), and the lower portion of the mouth fitting member (281) may include a restricting part (281*h*) configured to restrict entrance of the oil filling nozzle at a location extending further downward than the barrier layer (227).

Also, in the aforementioned present invention, a roughly worked surface (81*d*, 181*d*, 281*d*) may be provided on an outer peripheral surface of a mouth fitting member (81, 181, 281), and the mouth fitting member (81, 181, 281) and the oil filling port tubular part (80, 180, 280) may be integrated with a resin of the oil filling port tubular part (80, 180, 280) bonded to the roughly worked surface (81*d*, 181*d*, 281*d*).

Advantageous Effects of Invention

According to the tank made of resin in the present invention, the tank made of resin includes: the barrier layer provided on the inner surface of the tank body made of resin, the opening part is provided in the barrier layer, the thick part projecting toward the inside or the outside of the tank body is provided in the resin layer at the outer peripheral part of the opening part, and the barrier layer and the casting flange part at the base of the oil filling port tubular part are molded with the resin of the tank body in a state in which the casting flange part is located at the thick part. According to the configuration, since the end of the barrier layer is also molded with the resin of the tank body, it is possible to curb occurrence of rolling-up of the end of the barrier layer and to improve durability of the tank made of resin.

In the aforementioned present invention, the guide wall along which the oil filling nozzle is guided may be provided at the lower portion of the oil filling port tubular part, and the end edge of the opening part in the barrier layer may be located outside the guide wall in a radial direction. According to the configuration, since the barrier layer is located outward in the radial direction with the guide wall sandwiched therewith, it is possible to more strongly protect the end of the barrier layer.

Also, in the aforementioned present invention, the end edge of the opening part in the barrier layer may have a cylindrical shape or a conical shape with a section bent with a curvature, and the distal end may be located inside the recessed groove formed in the casting flange part. According to the configuration, since the recessed groove at the flange part and the barrier layer are integrally continuous with each other, it is possible to more strongly protect the end edge of the barrier layer.

Also, in the aforementioned invention, the annular step part may be provided between the lower portion of the oil filling port tubular part and the casting flange part, and the end edge of the opening part in the barrier layer may be inserted into the step part to locate the distal end. According to the configuration, it is possible to protect the end edge of the barrier layer in a wider range by the barrier layer being disposed in the annular step part at the lower portion of the oil filling port tubular part.

Also, in the aforementioned invention, the mouth fitting member may be provided at the oil filling port tubular part, and the mouth fitting member may include the attachment part that is a lid member for the oil filling port and the guide wall located at the lower portion of the oil filling port tubular part. According to the configuration, since the lid member of the oil filling port can be attached directly to the oil filling port tubular part provided with the mouth fitting member, and the guide wall functions to protect a resin part and the barrier layer during insertion of the oil filling nozzle, it is possible to simplify the structure of the oil filling port tubular part.

Also, in the aforementioned invention, the distal end of the end edge of the opening part in the barrier layer may be located inside the recessed groove formed in the outer peripheral surface of the lower portion of the oil filling port tubular part. According to the configuration, since the barrier layer inside the recessed groove in the oil filling port tubular part is integrally continuous with the resin layer of the tank body, it is possible to more strongly protect the end edge of the barrier layer.

Also, in the aforementioned invention, the mouth fitting member may be provided at the oil filling port tubular part, and the lower portion of the mouth fitting member may include the restricting part configured to restrict entrance of the oil filling nozzle at the location extending further downward than the barrier layer. According to the configuration, it is possible to protect the resin part and the barrier layer during insertion of the oil filling nozzle using the restricting part provided at the lower portion of the oil filling port tubular part provided with the mouth fitting member.

Also, in the aforementioned invention, the roughly worked surface may be provided on the outer peripheral surface of the mouth fitting member, and the mouth fitting member and the oil filling port tubular part may be integrated with the resin of the oil filling port tubular part bonded to the roughly worked surface. According to the configuration, it is possible to prevent fuel and the like from bleeding from the bonded part between the mouth fitting member and the oil filling port tubular part and to improve durability.

BRIEF DESCRIPTION OF DRAWINGS

FIGS. 9A and 9B are explanatory diagrams of a fuel tank according to a third embodiment of the present invention, where FIG. 9A is a sectional view of an oil filling port and FIG. 9B is a sectional view along the line IX-IX in FIG. 9A.

DESCRIPTION OF EMBODIMENTS

Hereinafter, embodiments of the present invention will be described with reference to drawings. In the explanation, description of directions such as front, back, left, right, up, and right are assumed to be the same as the directions with respect to a vehicle body unless otherwise particularly indicated. Also, the reference sign FR represented in the respective drawings indicates the front side of the vehicle body, the reference sign UP indicates the upper side of the vehicle body, and the reference sign LH indicates the left side of the vehicle body.

First Embodiment

Figure 1:
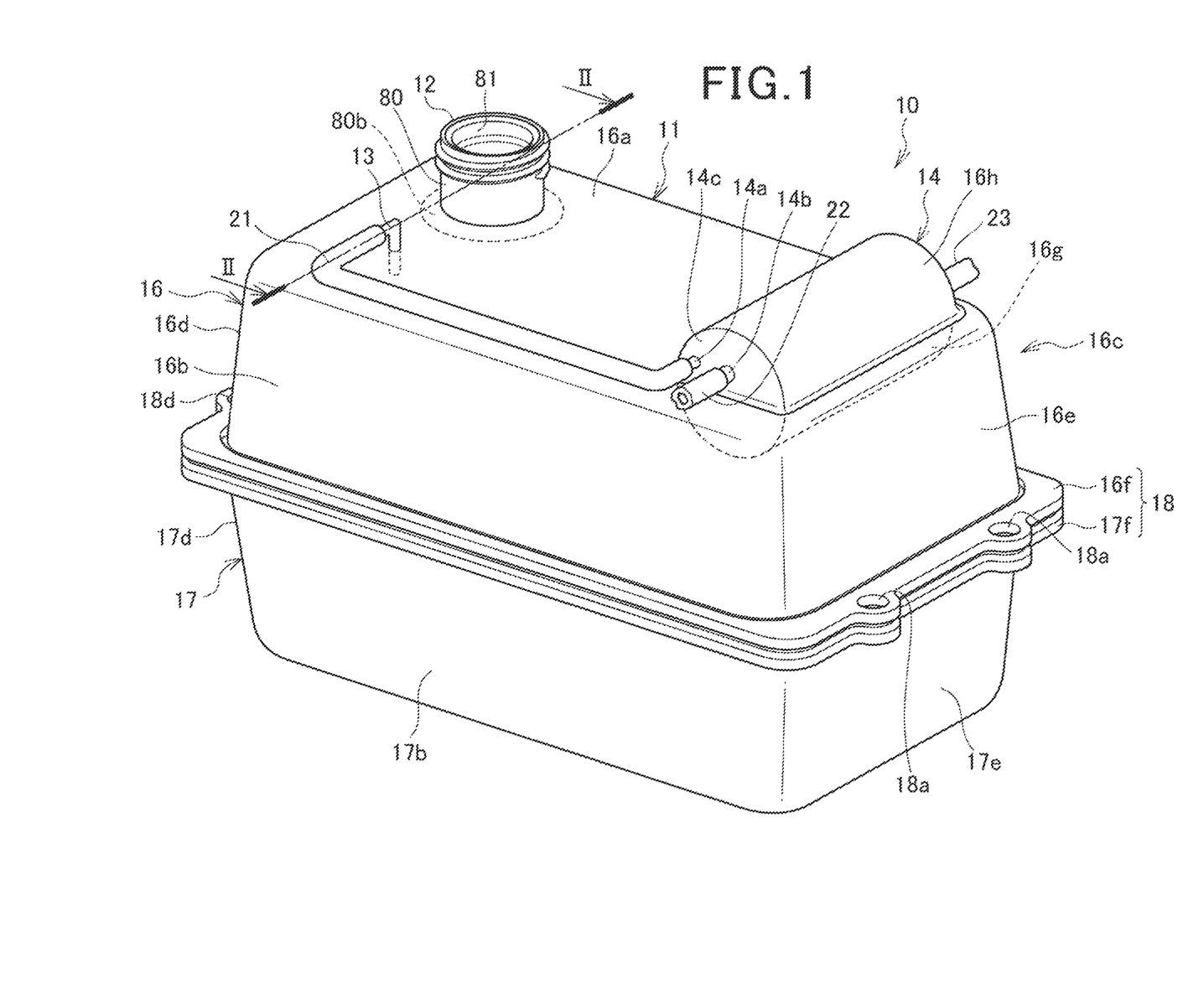
FIG. 1 is a perspective view illustrating a fuel tank according to a first embodiment of the present invention.
Figure 2:
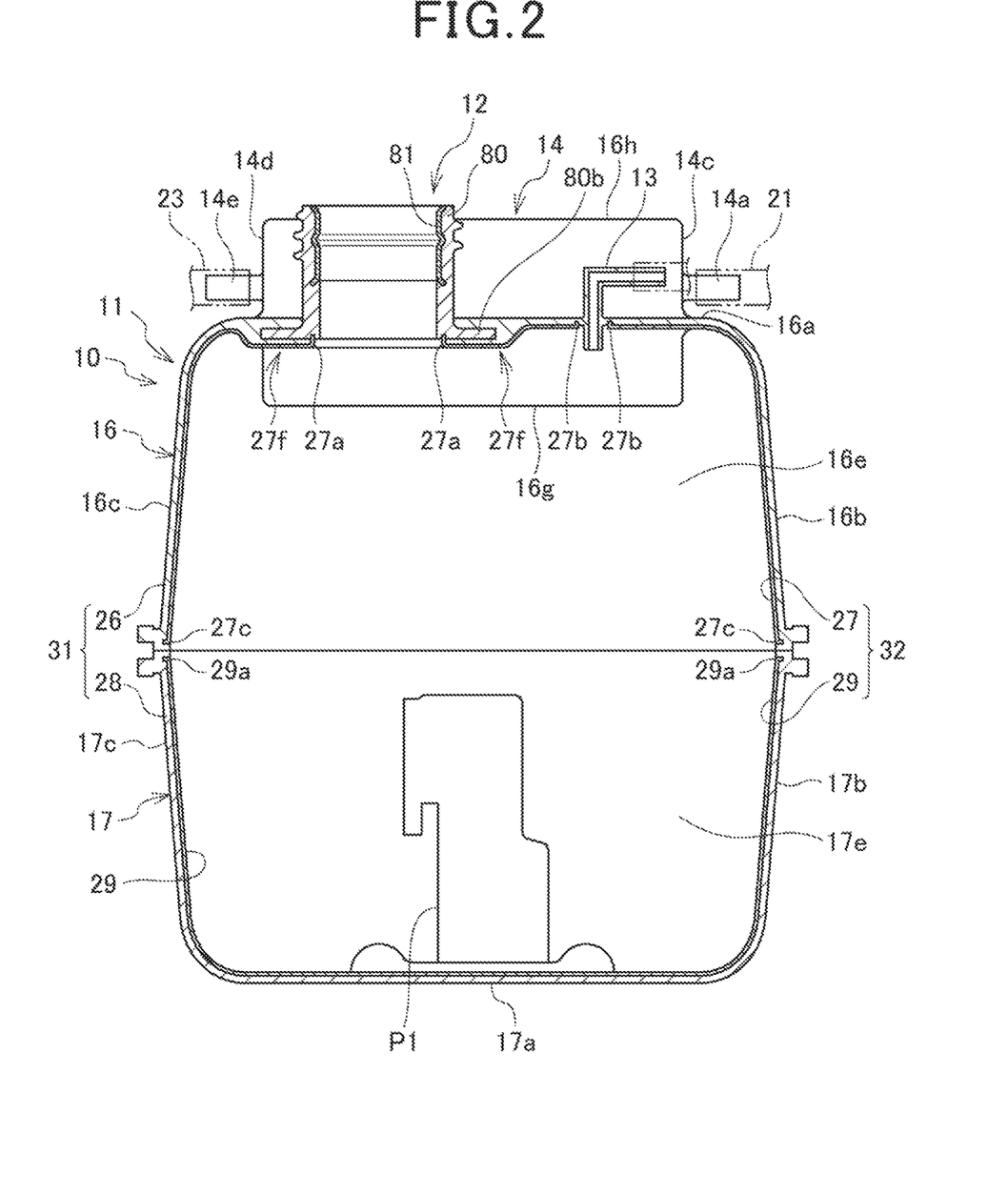
FIG. 2 is a sectional view along the line II-II in FIG. 1.

FIG. 1 is a perspective view illustrating a fuel tank 10 according to a first embodiment of the present invention, and FIG. 2 is a sectional view along the line II-II in FIG. 1.

The fuel tank (a tank made of resin) 10 includes a tank main part 11 that configures a main part in which fuel is stored, an oil filling port 12 configured to inject the fuel into the tank main part 11, an ejection port 13 configured to eject an evaporated fuel in the tank main part 11 to the outside, and a canister 14 provided integrally with a tank upper portion.

The tank main part 11 includes an upper half body 16 and a lower half body 17 made of resin.

The upper half body 16 includes an upper wall 16a, four side walls 16b, 16c, 16d, and 16e, and an upper flange 16f.

The upper wall 16a is provided the aforementioned oil filling port 12, the ejection port 13, and the canister 14. The side walls 16b, 16c, 16d, and 16e extend downward from peripheral edges of the upper wall 16a, and both edges of the respective side walls 16b, 16c, 16d, and 16e are connected to each other. The upper flange 16f is formed across the four side walls 16b, 16c, 16d, and 16e.

The lower half body 17 includes a bottom wall 17a (see FIG. 2), four side walls 17b, 17c, 17d, and 17e (see FIG. 2 for the reference sign 17c) standing from peripheral edges of the bottom wall 17a such that both edges of the respective side walls 17b, 17c, 17d, and 17e are connected to each other, and a lower flange 17f formed across these side walls 17b, 17c, 17d, and 17e. The bottom wall 17a is provided with a fuel pump unit P1 (see FIG. 2).

The aforementioned upper flange 16f and the lower flange 17f configure a flange 18, and the upper flange 16f and the lower flange 17f are joined to each other in an overlapping manner in the up-down direction.

A plurality of attachment holes 18a are formed in the flange 18, and the flange 18 can be attached to a vehicle body frame or the like of a vehicle with fastening members such as bolts and nuts or the like that are made to pass through the plurality of attachment holes 18a.

A cap (not illustrated) is screwed into an upper portion of the oil filling port 12, and the oil filling port 12 is blocked with the cap.

The canister 14 includes an accommodation recessed part 16g with a semi-cylindrical shape recessed in the upper wall 16a toward the inside of the tank and a cover 16h that covers the accommodation recessed part 16g from the upper side in a tightly closed manner, and an evaporated fuel adsorbing material is accommodated therein. The canister 14 adsorbs the evaporated fuel in the fuel tank 10 with the adsorbing material (activated carbon) once and further takes fresh air, thereby discharging the evaporated fuel from the activated carbon and supplying the fuel to an intake pipe of an engine (not illustrated) of the vehicle.

A charge port 14a and a purge port 14b are provided at one end of the canister 14. The charge port 14a is a portion that is connected to the ejection port 13 via a charge pipe 21 to take the evaporated fuel in the fuel tank 10 into the canister 14. The purge port 14b is a portion from which the evaporated fuel is discharged to the outside of the canister 14 and is connected to the intake pipe of the engine via the purge pipe 22.

The canister 14 is adapted such that the charge port 14a and the purge port 14b project from one end surface 14c in a longitudinal direction and a fresh air introduction port 14e projects from the other end surface 14d (see FIG. 2) in the longitudinal direction.

One end of a fresh air introduction pipe 23 is connected to the fresh air introduction port 14e. The other end of the fresh air introduction pipe 23 is opened to air, and fresh air is introduced into the canister 14 via the fresh air introduction pipe 23 and the fresh air introduction port 14e.

As illustrated in FIG. 2, the upper half body 16 of the tank main part 11 includes an upper-side tank body 26 made of resin and an upper-side barrier layer 27 provided over the entire inner surface of the tank body 26. The barrier layer 27 is adapted to curb transmission of the fuel to the outside of the fuel tank 10, is a shaped article shaped into a tank shape in advance, and is formed to substantially follow the outer shape of the tank. The thickness of the barrier layer 27 is substantially constant over the entire barrier layer 27. End edge parts 27a, 27b, and 27c bent toward the side of the upper-side tank body 26 are formed at ends of the upper-side barrier layer 27. The end edge parts 27a, 27b, and 27c are incorporated in the upper half body 16 such that the upper-side barrier layer 27 is unlikely to roll up.

The lower half body 17 of the tank main part 11 includes a lower-side tank body 28 made of resin and a lower-side barrier layer 29 provided over the entire inner surface of the lower-side tank body 28. The thickness of the barrier layer 29 is substantially constant over the entire barrier layer 29. An end edge part 29a bent toward the side of the lower-side tank body 28 is formed at an end of the lower-side barrier layer 29. The end edge part 29a is incorporated in the lower half body 17 such that the lower-side barrier layer 29 is unlikely to roll up.

The aforementioned tank bodies 26 and 28 configure a tank body 31 of the fuel tank 10. Also, the aforementioned barrier layers 27 and 29 configure a barrier layer 32 of the fuel tank 10.

Figure 3:
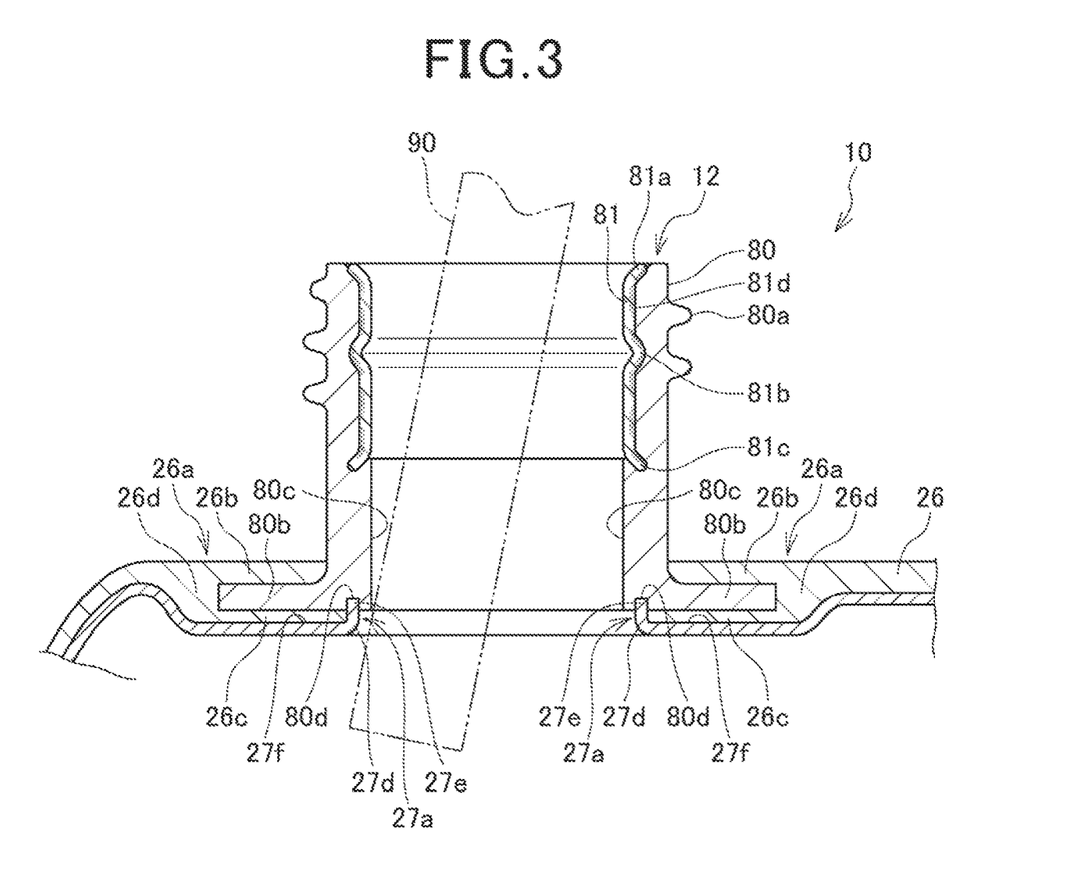
FIG. 3 is an enlarged view of an oil filling port in FIG. 2.

FIG. 3 is an enlarged view of the oil filling port 12 in FIG. 2.

The oil filling port 12 is formed in the upper wall 16a of the upper half body 16. The oil filling port 12 includes an oil filling port tubular part 80 for injecting fuel. The oil filling port tubular part 80 has a cylindrical shape extending in the up-down direction and establishes communication between the inside and the outside of the tank body 26. A male screw part (attachment part) 80a is formed in the outer peripheral surface of the oil filling port tubular part 80. A female screw part (not illustrated) of the cap (the lid member which is not illustrated) configured to block the oil filling port 12 is bonded to the male screw part 80a.

The oil filling port tubular part 80 is configured of a resin material that is the same as a resin material that configures the tank body 26 and is molded integrally with the tank body 26. A flange part (casting flange part) 80b is formed at a lower portion (base) of the oil filling port tubular part 80. The flange part 80b is formed into an annular plate shape spreading outward in the radial direction from the outer peripheral part of the oil filling port tubular part 80. The oil filling port tubular part 80 is supported by the tank body 26 in a state in which the flange part 80b is casted and incorporated in the resin of a thick part 26a included in the tank body 26.

The thick part 26a of the tank body 26 is formed in accordance with the position of the oil filling port 12. The thick part 26a has such a shape that an upper portion thereof has a planar shape and a lower portion thereof projects toward the inside of the tank body 26. The thick part 26a includes an annular thick plate part 26d located outside the oil filling port 12 in the radial direction, an annular plate-shaped upper plate part 26b that is thinner than the thick plate part 26d and is formed at an upper end of the thick plate part 26d, and an annular plate-shaped lower plate part 26c that is thinner than the thick plate part 26d and is formed at a lower end of the thick plate part 26d. The tank body 26 and the oil filling port tubular part 80 are molded integrally in a state in which the flange part 80b of the oil filling port tubular part 80 is sandwiched between the upper plate part 26b and the lower plate part 26c.

An inner peripheral wall (guide wall) 80c is provided at the lower portion of the oil filling port tubular part 80. The barrier layer 27 is located outside the inner peripheral wall 80c in the radial direction. The inner peripheral wall 80c guides the oil filling nozzle 90 at a position away from the barrier layer 27 and guides the oil filling nozzle 90 such that the oil filling nozzle 90 is not brought into contact with the barrier layer 27 disposed outward in the radial direction. It is possible to more strongly protect the end edge part 27a of the barrier layer 27.

The barrier layer 27 is formed on a lower surface (inner surface) of the tank body 26. The barrier layer 27 includes a circular opening part 27d formed in correspondence with the position of the oil filling port tubular part 80. The opening part 27d establishes communication between the inside and the outside of the tank body 26 via the oil filling port tubular part 80. The opening part 27d is formed to have a larger diameter than an inner diameter of the inner peripheral wall 80c of the oil filling port tubular part 80. The aforementioned end edge part (end edge) 27a bent on the side of the oil filling port tubular part 80 is formed at the opening part 27d. The end edge part 27a is formed to follow an inner peripheral edge of the opening part 27d and is formed into a cylindrical shape. An upper end (distal end) 27e of the end edge part 27a is located further outward than the inner peripheral wall 80c in the radial direction. The upper end 27e has entered an annular recessed groove 80d formed in the lower surface of the flange part 80b. The recessed groove 80d is recessed upward. Since the flange part 80b and the barrier layer 27 are integrally continuous with each other, the barrier layer 27 is unlikely to roll up, and it is possible to more strongly protect the end edge part 27a of the barrier layer 27.

A mouth fitting member 81 that is made of metal to cover an upper portion of an inner peripheral part at the oil filling port tubular part 80 above the inner peripheral wall 80c is supported. The mouth fitting member 81 is formed into a cylindrical shape extending along the oil filling port tubular part 80. A bead part 81a inclined further outward in the radial direction toward the upper side is formed at an upper end of the mouth fitting member 81. An intermediate rib 81b projecting outward in the radial direction is formed at the center of the mouth fitting member 81 in the up-down direction. A lower end rib 81c inclined further outward in the radial direction toward the lower side is formed at a lower end of the mouth fitting member 81. The mouth fitting member 81 is molded integrally with the oil filling port tubular part 80 with the resin of the oil filling port tubular part 80 in a state in which the bead part 81a, the intermediate rib 81b, and the lower end rib 81c are incorporated in the oil filling port tubular part 80. Since the mouth fitting member 81 is incorporated in and formed integrally with the resin of the oil filling port tubular part 80, the mouth fitting member 81 is strongly bonded to the oil filling port tubular part 80.

A textured surface (roughly worked surface) 81d is formed on the outer peripheral surface of the mouth fitting member 81. The mouth fitting member 81 is bonded to the oil filling port tubular part 80 made of resin in a state in which a contact area with the oil filling port tubular part 80 has increased due to minute irregularity of the textured surface 81d, and it is possible to prevent the fuel and the like from bleeding from the bonded part between the mouth fitting member 81 and the oil filling port tubular part 80 and to improve durability.

The barrier layer 27 includes a recessed part 27f located outside the opening part 27d in the radial direction. The recessed part 27f is recessed toward the inside of the tank body 26. The flange part 80b of the oil filling port tubular part 80 is disposed in the recessed part 27f. Also, the barrier layer 27, the flange part 80b, and the tank body 26 are molded integrally with the resin of the tank body 26. In other words, the thick part 26a is formed in the tank body 26 in correspondence with the position of the recessed part 27f and is molded integrally in a state in which the flange part 80b is sandwiched between the upper plate part 26b and the lower plate part 26c of the thick part 26a. Since the barrier layer 27 and the end edge part 27a thereof are molded integrally with the tank body 26, it is possible to prevent the barrier layer 27 from rolling up, to protect the barrier layer 27, and to improve durability of the fuel tank 10.

Figure 4:
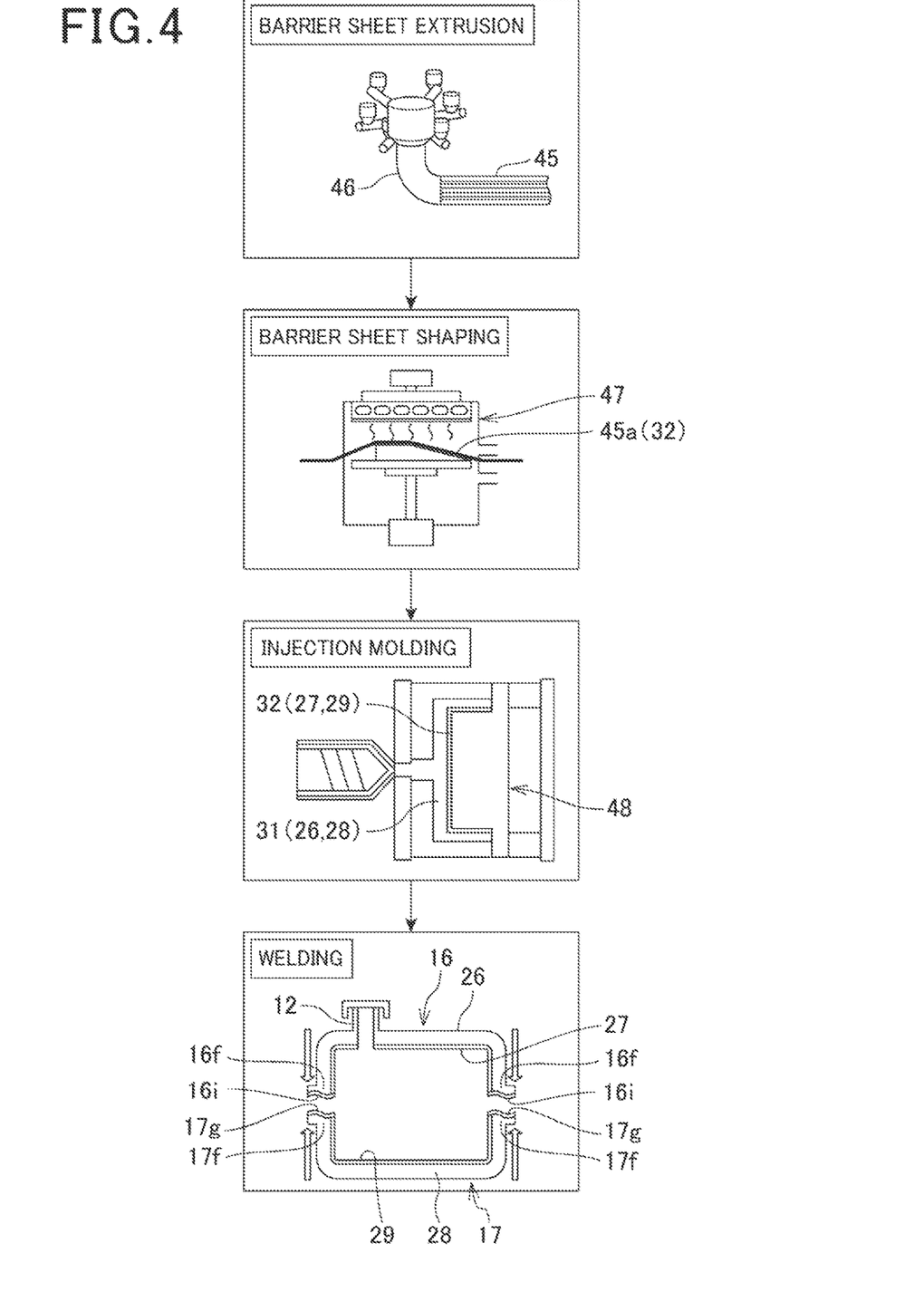
FIG. 4 is a schematic view illustrating a process for manufacturing the fuel tank.

FIG. 4 is a schematic view illustrating a process for manufacturing the fuel tank 10.

Referring to FIG. 4, a plurality of materials configuring the barrier layer 32 are supplied to a die 46 for extrusion molding, and a molded article 45 in a sheet shape is extruded from the die 46.

The molded article 45 is shaped into a shape that follows the inner surface of the tank body 31 and is then solidified by a vacuum molding machine 47, thereby forming a shaped article 45a. A peripheral edge of the barrier layer 32 that has turned into the shaped article 45a is trimmed with a mold for trimming (not illustrated).

The trimmed barrier layer 32 is set in a mold 48 for injection molding for molding the tank body 31 and is then integrated with the tank body 31 during the injection molding of the tank body 31. In other words, the barrier layer 32 is bonded to the inner surface of the tank body 31 through the insert molding. At this time, the oil filling port 12 is molded integrally with the tank body 31 through the insert molding.

Here, the upper-side barrier layer 27 and the lower-side barrier layer 29 are individually molded.

The upper-side barrier layer 27 is bonded to the upper-side tank body 26 during the injection molding of the upper-side tank body 26, thereby forming the upper half body 16. The lower-side barrier layer 29 is bonded to the lower-side tank body 28 during the injection molding of the lower-side tank body 28, thereby forming the lower half body 17.

During the injection molding, an upper-side joined surface 16i with a melting margin (not illustrated) is formed on the lower surface of the upper flange 16f of the upper half body 16, and a lower-side joined surface 17g with a melting margin (not illustrated) is formed on the upper surface of the lower flange 17f of the lower half body 17. The melting margins of the upper-side joined surface 16i and the lower-side joined surface 17g are melted through heating, and the upper-side joined surface 16i and the lower-side joined surface 17g are pressure-fitted to each other, thereby integrating the upper half body 16 and the lower half body 17.

The bent end edge parts 27a to 27c and 29a (see FIG. 2) are formed by trimming bent portions formed with curvatures at peripheral edges of the molded article 45 during the shaping using the vacuum molding machine 47, using a cutting blade of the aforementioned mold for trimming (not illustrated). Cut surfaces trimmed in the thickness direction of the end edge parts 27a to 27c and 29a using the aforementioned cutting blade are formed at distal ends of the end edge parts 27a to 27c and 29a. Therefore, it is possible to easily form the end edge parts 27a to 27c and 29a and to precisely form the end edge parts 27a to 27c and 29a.

The end edge parts 27a to 27c and 29a are incorporated in the upper half body 16 and the lower half body 17 when the upper half body 16 and the lower half body 17 are molded using the mold 48 for injection molding (FIG. 5). Therefore, it is possible to easily incorporate the end edge parts 27a to 27c and 29a.

A process for manufacturing the oil filling port 12 will be described using FIG. 3. The mouth fitting member 81 is formed in advance. The outer peripheral surface of the mouth fitting member 81 is textured to form the textured surface 81d. Shotblasting, for example, can be used for the texturing. The mouth fitting member 81 is set in a mold (not illustrated) for injection molding to mold the oil filling port tubular part 80, is then insert molded during injection molding of the oil filling port tubular part 80, and is then integrated with the oil filling port tubular part 80. Since the mouth fitting member 81 is adapted such that the bead part 81a, the intermediate rib 81b, and the lower end rib 81c are incorporated in the resin of the oil filling port tubular part 80, the mouth fitting member 81 and the oil filling port tubular part 80 are strongly bonded to each other. Also, since the mouth fitting member 81 and the oil filling port tubular part 80 are molded integrally in a state in which the contact area with the oil filling port tubular part 80 has increased due to the textured surface 81d, it is possible to prevent the fuel and the like from bleeding from the bonded part between the mouth fitting member 81 and the oil filling port tubular part 80, and durability is improved.

The integrally molded oil filling port 12 is molded integrally with the tank body 26 along with the barrier layer 27 through insert molding as illustrated in FIG. 4.

The shaped article 45a of the barrier layer 27 includes the end edge part 27a, the opening part 27d, and the like. The shaped article 45a is set in the mold 48. The flange part 80b of the oil filling port tubular part 80 is disposed in the recessed part 27f of the shaped article 45a, and the upper end 27e of the end edge part 27a is caused to enter and is incorporated in the recessed groove 80d of the flange part 80b.

In this state, the barrier layer 27, the flange part 80b, and the tank body 26 are molded integrally through insert molding. The thick part 26a is formed at the recessed part 27f with the resin of the tank body 26. The upper plate part 26b is formed above the flange part 80b with the resin of the tank body 26, and the lower plate part 26c is formed below the flange part 80b with the resin of the tank body 26. At this time, the barrier layer 27, the oil filling port 12, and the tank body 26 are integrated in a state in which the end edge part 27a of the barrier layer 27 has entered the recessed groove 80d of the flange part 80b and the flange part 80b of the oil filling port 12 is incorporated in the thick part 26a.

FIG. 5 is a sectional view illustrating the tank body 26 and the barrier layer 27 in the upper half body 16.

The upper half body 16 is configured of a total of six layers, namely the tank body 26 in one layer and the barrier layer 27 configured of five layers.

The barrier layer 27 includes a barrier layer body 41, adhesive layers 42 and 42 provided on both surfaces of the barrier layer body 41, and outer layers 43 and 43 caused to adhere to the barrier layer body 41 on both sides via the adhesive layers 42 and 42.

A material of the tank body 26 is high-density polyethylene (HDPE) in one example.

The barrier layer body 41 is adapted to reduce transmittance of the fuel and the like and is configured of a material through which the fuel and the like are more unlikely be transmitted than high-density polyethylene. The barrier layer body 41 is configured of an ethylene vinyl alcohol copolymer (EVOH) in one example.

The outer layers 43 and 43 are configured of the material that is the same as the material of the tank body 26 and are configured of high-density polyethylene in one example.

The barrier layer 27 is bonded to the inner surface of the tank body 26 via the outer layer 43 on the side of the tank body 26. Since the barrier layer 27 is bonded to the inner surface of the tank body 26 via the outer layer 43 of the material that is the same as the material of the tank body 26, high adhesiveness to the tank body 26 is achieved, and the barrier layer 27 is strongly bonded to the tank body 26.

The barrier layer 27 is brought into contact with the fuel with the outer layer 43 exposed to the inside of the tank body 26. Therefore, direct contact of the fuel to the barrier layer body 41 is prevented.

A layer structure of the lower half body 17 is similar to the layer structure of the upper half body 16, a layer structure of the lower-side tank body 28 is the same as the layer structure of the upper-side tank body 26, and a structure of the lower-side barrier layer 29 is the same as the structure of the upper-side barrier layer 27.

As described above, in the fuel tank 10 that includes the barrier layer 27 provided on the inner surface of the tank body 26 made of resin, the opening part 27d is provided in the barrier layer 27, the thick part 26a projecting toward the inside of the tank body 26 is provided at the resin layer of the outer peripheral part of the opening part 27d, and the barrier layer 27 and the flange part 80b at the base of the oil filling port tubular part 80 are molded with the resin of the tank body 26 in the state in which the flange part 80b is located at the thick part 26a, according to the first embodiment to which the present invention is applied. Therefore, since the end edge part 27a of the barrier layer 27 is also molded with the resin of the tank body 26, it is possible to curb rolling-up of the end edge part 27a of the barrier layer 27 and to improve durability of the fuel tank 10.

According to the first embodiment, the inner peripheral wall 80c along which the oil filling nozzle 90 is guided is provided at the lower portion of the oil filling port tubular part 80, and the end edge part 27a of the opening part 27d in the barrier layer 27 is located outside the inner peripheral wall 80c in the radial direction. Therefore, since the barrier layer 27 is located outward in the radial direction with the inner peripheral wall 80c sandwiched therewith, it is possible to more strongly protect the end edge part 27a of the barrier layer 27.

Also, in the first embodiment, the end edge part 27a of the opening part 27d in the barrier layer 27 has a cylindrical shape with a section bent with a curvature, and the end edge part 27a is located in the recessed groove 80d formed at the flange part 80b. Therefore, since the recessed groove 80d of the flange part 80b and the barrier layer 27 are integrally continuous with each other, it is possible to more strongly protect the end edge part 27a of the barrier layer 27.

Also, in the first embodiment, the textured surface 81d is provided on the outer peripheral surface of the mouth fitting member 81, and the mouth fitting member 81 and the oil filling port tubular part 80 are integrated with the resin of the oil filling port tubular part 80 bonded to the textured surface 81d. Therefore, it is possible to prevent the fuel and the like from bleeding from the bonded part between the mouth fitting member 81 and the oil filling port tubular part 80 and to improve durability.

FIG. 6 is a perspective view illustrating a shape modification example of the fuel tank 10 illustrated in FIG. 1.

A fuel tank 50 includes an upper half body 56 and a lower half body 57 with flat shapes obtained by reducing the dimensions of the upper half body 16 and the lower half body 17 in the fuel tank 10 illustrated in FIG. 1 in the up-down direction and has a wedge shape that is thin on the front side and is thick on the back side in a side view.

In other words, the fuel tank 50 includes a fuel pump unit P2 at the center of an upper surface of an upper half body 56, a tank main part 51 that configures a main part in which the fuel is stored, an oil filling port 12 configured to inject the fuel into the tank main part 51, an ejection port 13 configured to eject an evaporated fuel in the tank main part 51 to the outside, and a canister 14 provided integrally with a tank upper portion.

The tank main part 51 includes the upper half body 56 and the lower half body 57 made of resin.

The upper half body 56 includes an upper wall 56a, four side walls 56b, 56c, 56d, and 56e (the side wall 56c (not illustrated) is a wall facing the side wall 56b), and an upper flange 16f.

The lower half body 57 includes a bottom wall (not illustrated), four side walls 57b, 57c, 57d, and 57e standing from peripheral edges of the bottom wall such that both edges of the side walls 57b, 57c, 57d, and 57e are connected to each other (the side wall 57c (not illustrated) is a wall facing the side wall 57b), and a lower flange 17f formed across the side walls 57b, 57c, 57d, and 57e.

Figure 7:
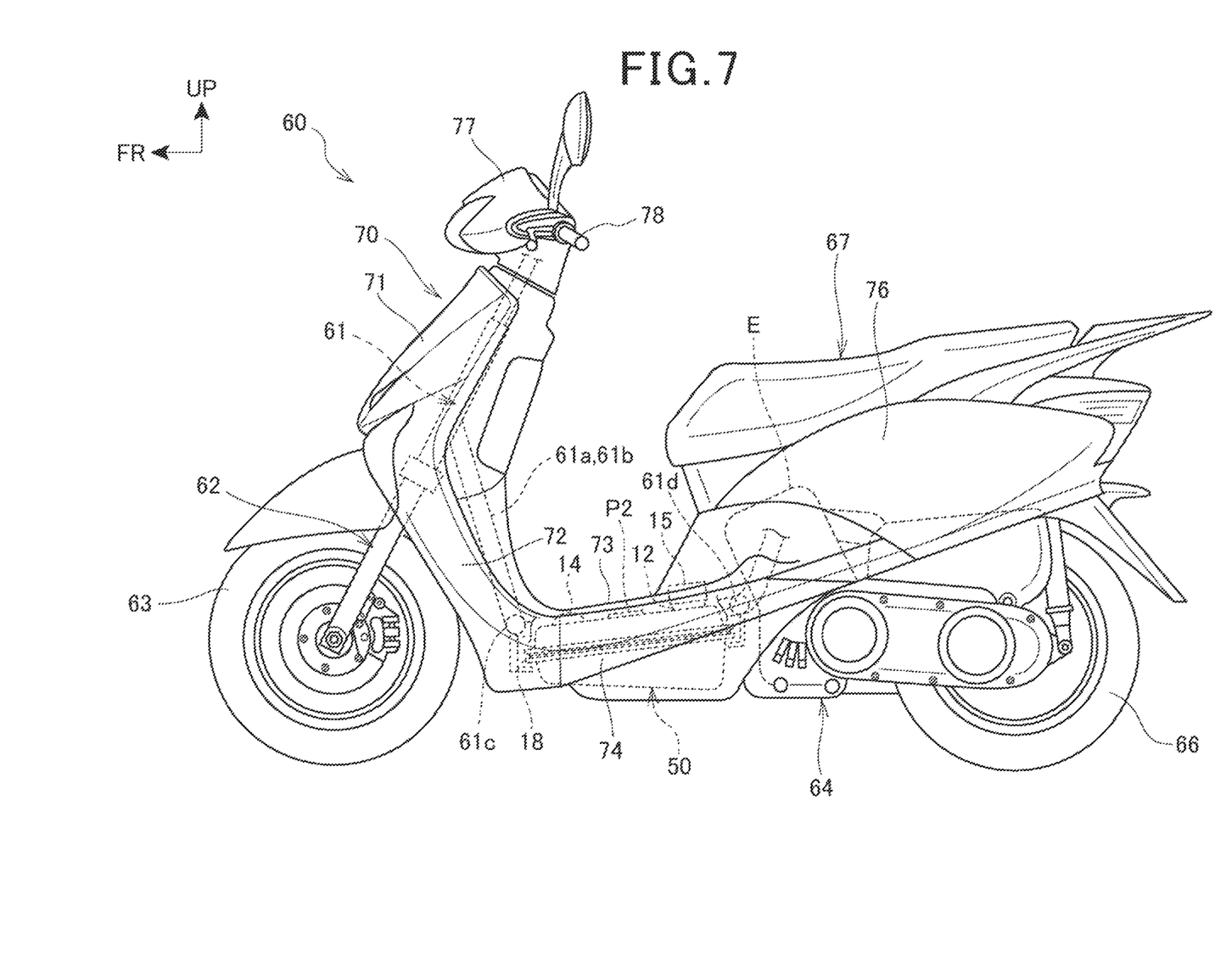
FIG. 7 is a left side view illustrating a motorcycle in which the fuel tank in FIG. 6 is mounted.

FIG. 7 is a left side view illustrating a motorcycle 60 in which the fuel tank 50 illustrated in FIG. 6 is mounted.

The motorcycle 60 includes a vehicle body frame 61, a front wheel 63 supported at a front end of the vehicle body frame 61 via a front fork 62, and a back wheel 66 supported at a lower portion of the vehicle body frame 61 via a power unit 64 that has an engine E.

The motorcycle 60 is a saddle-riding vehicle of a scooter type configured such that a driver straddles and sits on a seat 67 disposed above the power unit 64 and the back wheel 66 and includes a vehicle body cover 70 that covers the vehicle body frame 61 and the periphery thereof.

The vehicle body cover 70 includes a front cover 71, a pair of left and right leg shields 72, a pair of left and right floor steps 73, a pair of left and right side skirts 74, a pair of left and right body covers 76, and a handle cover 77.

The front cover 71 covers the front side of the front fork 62. The left and right leg shields 72 are connected to edges of the front cover 71 on both sides and cover, from the front side, legs of the driver sitting on the seat 67. The left and right floor steps 73 extend backward from lower ends of the left and right leg shields 72 and serve as footrest of the driver. The left and right side skirts 74 respectively extend downward from edges of the left and right floor steps 73 on both sides. The left and right body covers 76 cover the lower side of the seat 67 on both sides. The handle cover 77 covers the center part of a handle 78 attached to the upper portion of the front fork 62.

The fuel tank 50 is disposed below the left and right floor steps 73, and the periphery of the fuel tank 50 is covered with the vehicle body cover 70 including the floor steps 73, the side skirts 74, and the like.

The fuel tank 50 is adapted such that the canister 14 is disposed on the front side, and the oil filling port 12 (see FIG. 6) and the cap 15 blocking the oil filling port 12 are disposed on the back side and are covered with an opening/closing lid (not illustrated) provided with a locking function for filling the fuel at the body cover 76. The flange 18 of the fuel tank 50 is attached to a plurality of cross frames 61c and 61d stretched over a pair of left and right frame members 61a and 61b disposed below the left and right floor steps 73 via a plurality of attachment holes 18a, 18a, and 18a. The pair of left and right frame members 61a and 61b and the plurality of cross frames 61c and 61d configure a part of the vehicle body frame 61.

Second Embodiment

Figure 8:
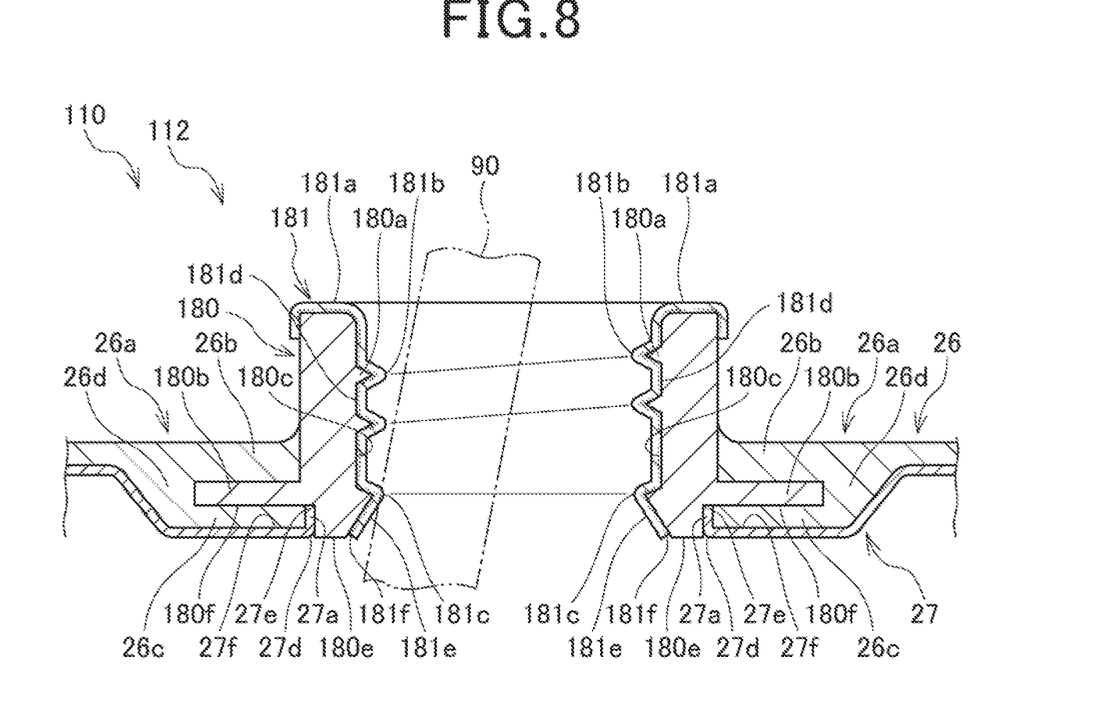
FIG. 8 is a sectional view of an oil filling port of a fuel tank according to a second embodiment of the present invention.

FIG. 8 is a sectional view of a part of an oil filling port 112 of a fuel tank 110 according to a second embodiment of the present invention.

In the second embodiment, the same reference signs will be applied to components that are the same as those in the first embodiment, and detailed description will be omitted.

The fuel tank (a tank made of resin) 110 according to the second embodiment includes the oil filling port 112. The oil filling port 112 includes an oil filling port tubular part 180 and a mouth fitting member 181 instead of the oil filling port tubular part 80 and the mouth fitting member 81 according to the first embodiment. The oil filling port tubular part 180 and the mouth fitting member 181 can be formed similarly to the first embodiment, and the oil filling port tubular part 180 and the mouth fitting member 181 are molded integrally with a resin of the oil filling port tubular part 180 similarly to the first embodiment.

The oil filling port tubular part 180 has a cylindrical shape extending in the up-down direction and establishes communication between the inside and the outside of the tank body 26. An annular plate-shaped flange part 180b spreading in the radial direction is formed at a lower portion (base) of the outer peripheral part of the oil filling port tubular part 180.

The flange part 180b is supported in a state in which the flange part 180b is incorporated in a resin of a thick part 26a included in a tank body 26.

A step part 180f which forms a step difference from a lower end 180e of the oil filling port tubular part 180 is formed in the lower surface of the flange part 180b. The step part 180f is formed into an annular shape. Also, the step part 180f is not limited to the lower surface of the flange part 180b and may be provided between the flange part 180b and the lower portion of the oil filling port tubular part 180 located further downward than a lower end 180e of the oil filling port tubular part 180. An end edge 27a of a barrier layer 27 is disposed in an inserted state in the step part 180f. The end edge part 27a is in contact with the outer peripheral surface of the oil filling port tubular part 180, and an upper end 27e is in contact with the flange part 180b. It is possible to protect the end edge part 27a of the barrier layer 27 in a wider range by the annular step part 180f provided between the lower end 180e of the oil filling port tubular part 180 and the flange part 180b.

A mouth fitting member 181 extending along an inner peripheral wall 180c of the oil filling port tubular part 180, covers the inner peripheral wall 180c, and is made of metal is supported at the oil filling port tubular part 180. The mouth fitting member 181 is formed into a cylindrical shape. A mouth fitting bent part 181a is formed at an upper end of the mouth fitting member 181. The mouth fitting bent part 181a is bent downward after spreading outward in the radial direction. Since the mouth fitting bent part 181a covers the upper end of the oil filling port tubular part 180, the oil filling nozzle 90 is prevented from being brought into contact with the oil filling port tubular part 180 made of resin.

A female screw part (attachment part) 181b is formed in the inner peripheral surface of the mouth fitting member 181. A male screw part (not illustrated) of a cap configured to block the oil filling port 112 is bonded to the female screw part 181b. Also, a rib 180a of the oil filling port tubular part 180 enters the rear side (outer peripheral side) of the mouth fitting member 181 in correspondence with the position of the female screw part 181b. The rib 180a is formed in a spiral shape projecting from the inner peripheral wall 180c of the oil filling port tubular part 180. Since the rib 180a has entered the mouth fitting member 181, the mouth fitting member 181 and the oil filling port tubular part 180 are strongly bonded to each other.

A projecting part 181c expanding inward in the radial direction is formed below the mouth fitting member 181. The projecting part 181c is formed into an annular shape. A guide wall 181e inclined further outward in the radial direction toward the lower side is formed at a lower portion of the projecting part 181c. A lower end 181f of the guide wall 181e is disposed further inward in the radial direction than the end edge part 27a of the barrier layer 27. The oil filling nozzle 90 is guided by the guide wall 181e at a position away from the barrier layer 27, and the barrier layer is protected.

A textured surface 181d is formed on the outer peripheral surface of the mouth fitting member 81, and increased bonding properties with respect to the oil filling port tubular part 180 are achieved.

It is possible to attach the cap (the lid member which is not illustrated) of the oil filling port 112 to the oil filling port tubular part 180 by the mouth fitting member 181 and the oil filling port tubular part 180 being molded integrally. Also, it is possible to guide the oil filling nozzle 90 using the guide wall 181e of the mouth fitting member 181 during the insertion of the oil filling nozzle 90 and thereby to protect the resin of the oil filling port tubular part 180 and the barrier layer 27. Therefore, it is not necessary to provide a screw part for attaching the lid member to the oil filling port tubular part 180 and a protection function for the oil filling nozzle 90, and it is thus possible to simplify the structure of the oil filing port tubular part 180 itself made of resin.

As described above, in the fuel tank 110 that includes the barrier layer 27 provided on the inner surface of the tank body 26 made of resin, the opening part 27d is provided in the barrier layer 27, the thick part 26a projecting toward the inside of the tank body 26 is provided at the resin layer of the outer peripheral part of the opening part 27d, and the barrier layer 27 and the flange part 180b at the base of the oil filling port tubular part 180 are molded with the resin of the tank body 26 in the state in which the flange part 180b is located at the thick part 26a, according to the second embodiment to which the present invention is applied. Therefore, it is possible to prevent the barrier layer 27 from rolling up, to protect the barrier layer 27, and to improve durability of the fuel tank 110 similarly to the first embodiment.

According to the second embodiment, the annular step part 180f is provided between the lower portion of the oil filling port tubular part 180 and the flange part 180b, and the end edge part 27a of the opening part 27d in the barrier layer 27 is inserted into the step part 180f to locate the upper end 27e. Therefore, it is possible to protect the end edge part 27a of the barrier layer 27 in a wider range by the barrier layer 27 being disposed in the annular step part 180f between the lower portion of the oil filling port tubular part 180 and the flange part 180b.

Also, in the second embodiment, the mouth fitting member 181 is provided at the oil filling port tubular part 180, the female screw part 181b of the cap (not illustrated) of the oil filling port 112 located at the mouth fitting member 181 and the guide wall 181e located at the lower portion of the oil filling port tubular part 180 are included. According to the configuration, the cap (not illustrated) of the oil filling port 112 is attached directly to the oil filling port tubular part 180 provided with the mouth fitting member 181, and the guide wall 181e can be caused to function to protect the resin part of the tank body 26 and the barrier layer 27 during the insertion of the oil filling nozzle 90. Therefore, it is possible to simplify the structure of the oil filling port tubular part 180 itself.

Third Embodiment

Figure 9A:
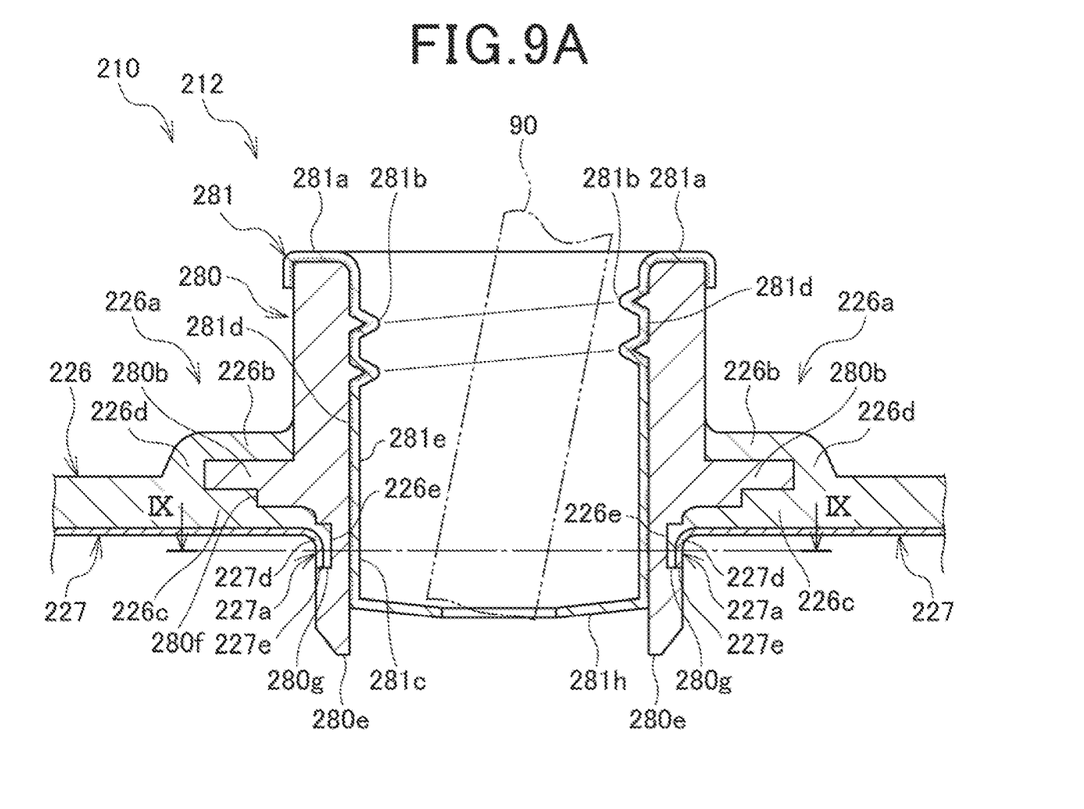
Figure 9B:
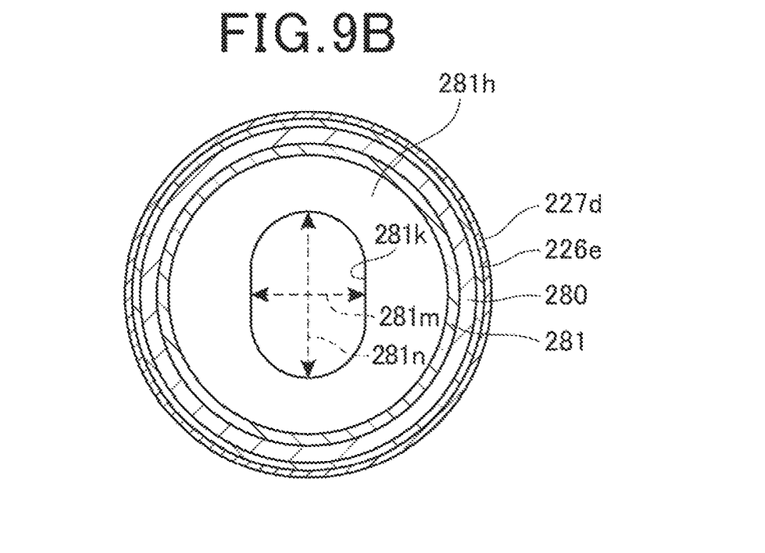

FIGS. 9A and 9B are explanatory diagrams of a fuel tank 210 according to a third embodiment of the present invention, where FIG. 9A is a sectional view of a part corresponding to the oil filling port 212, and FIG. 9B is a sectional view along the line IX-IX in FIG. 9A.

In the third embodiment, the same reference signs will be applied to components that are the same as those in the first embodiment and the second embodiment, and detailed description will be omitted.

A fuel tank (a tank made of resin) 210 according to the third embodiment includes an upper-side tank body 226 and an oil filling port 212 instead of the upper-side tank body 26 and the oil filling port 112 in the second embodiment.

The oil filling port 212 includes an oil filling port tubular part 280 and a mouth fitting member 281.

The oil filling port tubular part 280 has a cylindrical shape extending in the up-down direction and projects to the lower side (inside) of the tank body 226 through an opening part 227d of a barrier layer 227. A recessed groove 280g recessed toward the inside in the radial direction and provided in an annular shape is formed in an outer peripheral surface of the oil filling port tubular part 280. An end edge part 227a of the opening part 227d in the barrier layer 227 is inserted into the recessed groove 280g. A distal end 227e of the end edge part 227a is in contact with the oil filling port tubular part 280. Since the barrier layer 227 is integrally continuous with a resin layer 226e of the tank body 226 in the recessed groove 280g of the oil filling port tubular part 280, it is possible to more strongly protect the end edge of the barrier layer 227.

A flange part 280b is formed further upward than the recessed groove 280g in the outer peripheral surface of the oil filling port tubular part 280. The flange part 280b is formed into an annular plate shape spreading outward in the radial direction. The oil filling port tubular part 280 is supported at the tank body 226 in a state in which the flange part 280b is incorporated in a thick part 226a. Also, an annular step difference part 280f is formed at the outer peripheral part of the lower surface of the flange part 280b.

The thick part 226a of the upper-side tank body 226 has an upper portion expanding to the outside of the upper-side tank body 226 and a lower portion formed into a planar shape. The thick part 226a includes a thick plate part 226d located outside the oil filling port 212 in the radial direction, an annular plate-shaped upper plate part 226b that is thinner than the thick plate part 226d and is formed at an upper end of the thick plate part 226d, and an annular plate-shaped lower plate part 226c that is thinner than the thick plate part 226d and is formed at a lower end of the thick plate part 226d. The tank body 226 and the oil filling port tubular part 280 are molded integrally with the resin of the tank body 226 in a state in which the flange part 280b of the oil filling port tubular part 280 is sandwiched between the upper plate part 226b and the lower plate part 226c.

The mouth fitting member 281 is supported at the oil filling port tubular part 280. The mouth fitting member 281 according to the third embodiment includes a mouth fitting bent part 181a, a female screw part 181b, a guide wall 281e, and a restricting part 280h.

The mouth fitting member 281 extends along the oil filling port tubular part 280 and extends further inward (downward) than the opening part 227d in the barrier layer 227 through the opening part 227d in the upper-side barrier layer 227. The mouth fitting member 281 includes a guide wall 281e located further downward than the female screw part 181b. The oil filling nozzle 90 is guided by the guide wall 281e.

The substantially disk-shaped restricting part 281h is formed at a lower end of the guide wall 281e. The restricting part 281h has a substantially disk shape and slightly shrinks downward such that the fuel moves to the center due to its own weight. A long hole 281k is formed at the center of the restricting part 281h. The long hole 281k is formed such that the width (short axis) 281m thereof is shorter than the diameter of the oil filling nozzle 90, and the long hole 281k is formed such that the length (long axis) 281n thereof is longer than the diameter of the oil filling nozzle 90. Therefore, it is possible to restrict downward entrance of the oil filling nozzle 90 beyond the restricting part 281h while setting the area of the opening portion of the long hole 281k to be equal to or greater than the area of the opening portion of the oil filling nozzle 90. In this manner, it is possible to prevent the oil filling nozzle 90 from being brought into contact with the barrier layer 227. Also, since the long hole 281k has a large opening area, the fuel supplied from the oil filling nozzle 90 is likely to quickly flow into the fuel tank 210.

As described above, in the fuel tank 210 that includes the barrier layer 227 provided on the inner surface of the tank body 226 made of resin, the opening part 227d is provided in the barrier layer 227, the thick part 226a projecting toward the outside of the tank body 226 is provided in the resin layer of the outer peripheral part of the opening part 227d, and the barrier layer 227 and the flange part 280b at the base of the oil filling port tubular part 280 are molded with the resin of the tank body 226 in the state in which the flange part 280b is located at the thick part 226a, according to the third embodiment to which the present invention is applied. Therefore, the fuel tank 210 according to the third embodiment can prevent the barrier layer 227 from rolling up, can protect the barrier layer 227, and can improve durability of the fuel tank 210 similarly to the first embodiment and the second embodiment.

According to the third embodiment, the distal end 227e of the end edge part 227a of the opening part 227d in the barrier layer 227 is located in the recessed groove 280g formed in the outer peripheral surface of the lower portion of the oil filling port tubular part 280. Therefore, since the barrier layer 227 is integrally continuous with the resin layer of the tank body 226 in the recessed groove 280g of the oil filling port tubular part 280, it is possible to more strongly protect the end edge part 227a of the barrier layer 227.

Also, according to the third embodiment, the mouth fitting member 281 is provided at the oil filling port tubular part 280, and the lower portion of the mouth fitting member 281 includes the restricting part 280h configured to restrict entrance of the oil filling nozzle 90 at the position extending further downward than the barrier layer 227. According to the configuration, the restricting part 281h provided at the lower portion of the oil filling port tubular part 280 provided with the mouth fitting member 281 can protect the resin part of the oil filling port tubular part 280 and the barrier layer 227 with respect to the insertion of the oil filling nozzle 90.

The aforementioned embodiments illustrates only aspects of the present invention and can arbitrarily be modified and applied without departing from the gist of the present invention.

Although the configuration in which the end edge parts 27a and 227a of the opening parts 27d and 227d have cylindrical shapes has been described above in the aforementioned embodiments, a configuration in which the end edge parts 27a and 227a have conical shapes or frustoconical shapes in which the diameters of the distal ends 27e and 227e are different from the diameters of base ends may also be employed.

Also, the oil filling port 12 according to the first embodiment can employ a configuration in which a female screw part is provided instead of the male screw part 80a, and a male screw part may be provided instead of the female screw part 181b in the oil filling port 112 according to the second embodiment and the oil filling port 212 according to the third embodiment.

Also, although the fuel tank 50 is mounted in the motorcycle 60 of a scooter type as illustrated in FIG. 8 in the aforementioned embodiments, the present invention is not limited thereto and can be applied to saddle-riding vehicles including vehicles other than the motorcycle. Also, the saddle-riding vehicles generally include vehicles on which drivers ride by straddling on vehicle bodies and are vehicles including not only motorcycles (including bicycles provided with motors) but three-wheel vehicles and four-wheel vehicles categorized in all-terrain vehicles (ATVs).

Further, although the upper half bodies 16 and 56 and the lower half bodies 17 and 57 have been described as examples of the divided bodies that configure the fuel tanks 10, 50, 110, and 210 in the aforementioned respective embodiments, the present invention is not limited thereto, and each of the fuel tanks 10, 50, 110, and 210 may be divided into three or more divided bodies. For example, each of the fuel tanks 10, 50, 110, and 210 may be formed by joining the lower half body 17 configured by a single split body to an upper half body configured of two divided bodies.

Also, the fuel tanks 10, 50, 110, and 210 are not limited to vehicles and may be mounted or placed in industrial machines or facilities in which engines are mounted.

REFERENCE SIGNS LIST 26, 226 Tank body
26a, 226a Thick part
27, 227 Barrier layer
27a, 227a End edge
27d, 227d Opening part
27e, 227e Distal end
80, 180, 280 Oil filling port tubular part
80b, 180b, 280b Casting flange part
80c, 181e, 281e Guide wall
80d, 280g Recessed groove
81d, 181d, 281d Roughly worked surface
180f Step part
181, 281 Mouth fitting member
181b Attachment part
281h Restricting part

The invention claimed is:

1. A tank made of resin, comprising:
a barrier layer provided on an inner surface of a tank body made of resin,
wherein an opening part is provided in the barrier layer, a thick part projecting toward an inside or an outside of the tank body is provided in a resin layer at an outer peripheral part of the opening part, and the barrier layer and a casting flange part at a base of an oil filling port tubular part are molded with the resin of the tank body in a state in which a distal end of an end edge of the opening part in the barrier layer is located at the thick part and is located inside a recessed groove that is in an annular shape and that is formed in a lower surface of the casting flange part,
wherein the end edge of the opening part in the barrier layer has a cylindrical shape or a conical shape with a section bent with a curvature, and a guide wall, along which an oil filling nozzle is guided, is provided at a lower portion of the oil filling port tubular part, and
wherein the end edge is located outside the guide wall in a radial direction.

2. The tank made of resin according to claim 1, comprising:
a mouth fitting member provided at the oil filling port tubular part, and a roughly worked surface provided on an outer peripheral surface of the mouth fitting member, wherein the mouth fitting member and the oil filling port tubular part are integrated with a resin of the oil filling port tubular part bonded to the roughly worked surface.

3. The tank made of resin according to claim 1,
wherein a mouth fitting member is provided at the oil filling port tubular part, and the mouth fitting member includes an attachment part that is a lid member for an oil filling port and the guide wall located at the lower portion of the oil filling port tubular part.

4. The tank made of resin according to claim 1,
wherein a mouth fitting member is provided at the oil filling port tubular part, and a lower portion of the mouth fitting member includes a restricting part configured to restrict entrance of the oil filling nozzle at a location extending further downward than the barrier layer.

5. The tank made of resin according to claim 2,
wherein a mouth fitting member is provided at the oil filling port tubular part, and the mouth fitting member includes an attachment part that is a lid member for an oil filling port and the guide wall located at the lower portion of the oil filling port tubular part.

6. The tank made of resin according to claim 2,
wherein a mouth fitting member is provided at the oil filling port tubular part, and a lower portion of the mouth fitting member includes a restricting part configured to restrict entrance of an oil filling nozzle at a location extending further downward than the barrier layer.

* * * * *